United States Patent
Aoki et al.

[11] Patent Number: 6,054,860
[45] Date of Patent: *Apr. 25, 2000

[54] DEVICE FOR DETECTING KNOCKING IN AN INTERNAL COMBUSTION ENGINE

[75] Inventors: Keiichiro Aoki, Susono; Yoichi Kurebayashi, Toyohashi, both of Japan

[73] Assignees: Toyota Jidosha Kabushiki Kaisha, Aichi-ken; Denso Corporation, Aichi-Pref., both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/932,599

[22] Filed: Sep. 17, 1997

[30] Foreign Application Priority Data

Sep. 19, 1996 [JP] Japan .................................. 8-247833

[51] Int. Cl.⁷ .............................. F02P 17/00; G01L 23/22
[52] U.S. Cl. .......................................... 324/402; 73/35.08
[58] Field of Search .................................. 324/402, 388, 324/399, 378, 382, 393, 380; 73/35.08

[56] References Cited

U.S. PATENT DOCUMENTS

| | | | |
|---|---|---|---|
| 4,364,260 | 12/1982 | Chen | 73/35 |
| 4,922,883 | 5/1990 | Iwasaki | 123/598 |
| 5,109,820 | 5/1992 | Iwata et al. | 123/406.37 |
| 5,287,837 | 2/1994 | Hashimoto et al. | 123/406.29 |
| 5,425,339 | 6/1995 | Fukui | 123/406.26 |
| 5,652,520 | 7/1997 | Kawamoto | 324/388 |
| 5,836,285 | 11/1998 | Aoki et al. | 123/406.37 |
| 5,900,536 | 5/1999 | Mogi et al. | 73/35.08 |

FOREIGN PATENT DOCUMENTS 196 01 353   1/1997   Germany .
6159129      6/1994   Japan .

*Primary Examiner*—Josie Ballato
*Assistant Examiner*—Russell M. Kobert
*Attorney, Agent, or Firm*—Kenyon & Kenyon

[57] ABSTRACT

A device for detecting knocking in an internal combustion engine capable of preventing accuracy for detecting knocking from being deteriorated by noise when resetting the LC resonance masking unit. An ionic current signal detected by an ionic current detecting unit is supplied to a buffer amplifier 5 via an LC resonance masking unit 31. To a first operational amplifier 51 of the buffer amplifier is connected a capacitor 513 for rejecting noise in parallel with a first feedback resistor 512. A second operational amplifier inverts again the ionic current signal inverted by the first operational amplifier. The buffer amplifier prevents a stepwise change on the input to the band-pass filtering unit when the masking of the LC resonance masking unit is reset, and suppresses a reduction in accuracy for detecting the knocking.

4 Claims, 6 Drawing Sheets

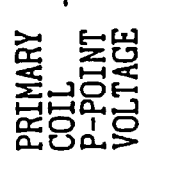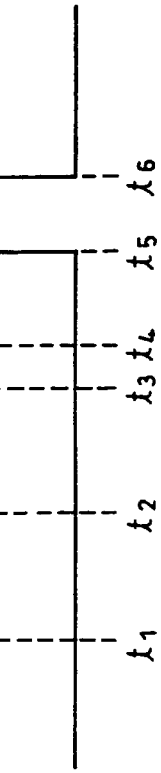
Fig. 2A Prior Art — IGNITION SIGNAL IGT
Fig. 2B Prior Art — PRIMARY COIL P-POINT VOLTAGE
Fig. 2C Prior Art — SECONDARY COIL S-POINT VOLTAGE
Fig. 2D Prior Art — ION CURRENT DETECTOR INPUT VOLTAGE
Fig. 2E Prior Art — KNOCKING WINDOW

DEVICE FOR DETECTING KNOCKING IN AN INTERNAL COMBUSTION ENGINE

BACKGROUND OF THE INVENTION

1. Field of the Invention

The present invention relates to a device for detecting knocking in an internal combustion engine. More particularly, the invention relates to a device for detecting knocking in an internal combustion engine which is capable of preventing the accuracy of detecting knocking from being deteriorated by noise when an LC resonance masking is reset.

2. Prior Art

In an internal combustion engine using gasoline as a fuel, the gas mixture compressed by a piston is ignited by a spark plug and is burned to produce an output. That is, in the normal combustion, a nucleus of a burning gas mixture is formed near the gap of the spark plug, and the flame propagates over the combustion chamber.

The ignition timing of the spark plug has an intimate relationship with the output of the internal combustion engine. When the ignition timing is too late, the propagation speed of the flame becomes slow. Therefore, the combustion becomes slow resulting in a decrease in the combustion efficiency and, hence, in a decrease in the output of the internal combustion engine.

When the ignition timing is early, on the other hand, the propagation of the flame is fast, whereby a maximum pressure of combustion rises and the output of the internal combustion engine increases. When the ignition timing is too early, however, there takes place knocking in which the gas mixture self-ignites prior to the propagation of flame, often damaging the internal combustion engine.

That is, it is advantageous to operate the internal combustion engine in a region in which the ignition timing is set to just before the occurrence of knocking (MBT: minimum spark advance for best torque) from the standpoint of fuel efficiency and output. It is very important to reliably detect the occurrence of knocking.

A knock sensor which is a vibration sensor has heretofore been used for detecting knocking. However, a device has been studied which detects knocking by utilizing the phenomenon that ions are generated in the combustion chamber due to the combustion of the gas mixture and an ionic current flows.

FIG. 1 is a diagram schematically illustrating an ignition circuit for an internal combustion engine, wherein an end of a primary coil 111 of an ignition coil 11 is connected to the positive electrode of a battery 12. The other end is grounded via the collector and the emitter of a switching transistor 13 included in an igniter.

The base of the transistor 13 is connected to an ignition timing control unit 14, so that the transistor 13 is turned on when an ignition signal IGT is output from the ignition timing control unit 14.

An end of a secondary coil 112 of the ignition coil 11 is also connected to the positive electrode of the battery 12, and the other end is connected to a spark plug 18 through a reverse-current preventing diode 15, a distributor 16 and a high-tension cable 17.

An ionic current detecting unit 19 is connected to the other end of the secondary coil 112 of the ignition coil 11 in parallel with the spark plug 18.

The ionic current is supplied, through a protection diode 191, to a series circuit of a current-to-voltage conversion resistor 192 and a bias power source 193. A voltage generated at a point where the current-to-voltage conversion resistor 192 and the protection diode 191 are connected together, is applied to an amplifying circuit 195 composed of an operational amplifier and a resistor through a capacitor 194 for removing a DC component.

Therefore, a voltage signal proportional to the AC component of the ionic current is output at an output terminal 196 of the ionic current detecting unit 19.

FIGS. 2A to 2E are diagrams of waveforms at each of the portions of the ignition circuit (FIG. 1) and show, respectively, an ignition signal IGT, a voltage on the grounding side of the primary coil (point P), a voltage on the high-tension side of the secondary coil (point S), and a voltage input to the amplifying circuit (point I). All abscissa represent time.

When the ignition signal IGT turns to the "H" level at $t_1$, and the transistor 13 is turned on and the voltage at point P drops. Immediately after $t_1$, a negative high-voltage pulse is generated at point S, that is, on the high-voltage side of the secondary coil. However, the current is blocked by the reverse current-preventing diode 15 from flowing into the spark plug 18.

When the ignition signal IGT turns to the "L" level at $t_2$ and the transistor 13 is cut off, a voltage at point P abruptly rises, and a positive high-voltage pulse is generated at point S.

The positive high-voltage pulse is not blocked by the reverse current-preventing diode 15 and flows into the spark plug 18 to be discharged. It is prevented by the protection diode 191 from flowing into the ionic current detecting unit 19.

Furthermore, from $t_3$ to $t_4$ after the discharge of the spark plug 18, LC resonance is triggered by energy remaining in the ignition coil 11 due to parasitic inductance and parasitic capacitance of the high-tension cable 17 and the like.

The gas mixture in the cylinder is ignited by the discharge of the spark plug 18, ions are generated in the cylinder as the flame spreads, and an ionic current starts flowing. The ionic current increases with an increase in the pressure in the cylinder and decreases with a decrease in the pressure in the cylinder.

When knocking occurs in the internal combustion engine, knocking signals of a particular frequency (about 6 KHz) are superposed while the ionic current decreases after having reached its peak.

In order to detect knocking using the ionic current, therefore, it is desired to detect only the knocking signals in the particular frequency and reject other signals (e.g., LC resonance wave). For this purpose, therefore, it is desired to provide a knocking signal window which opens at $t_5$ after no extra signal exists and closes at a suitable moment (e.g., ATDC 60°) after the ionic current has decreased, and to detect the knocking based upon the output of the ionic current detecting unit 19 while the knocking signal window is open.

The ionic current detecting unit 19, however, detects a very small ionic current and the amplifying circuit 195 must have a very large input impedance and gain, inevitably picking up noise due to corona discharge of the spark plug 18.

In order to solve this problem, a method for detecting knocking by extracting the knocking frequency components from the output of the ionic current detecting unit by using a band-pass filter, and integrating the knocking frequency components to reject noise has been already proposed (see Japanese Unexamined Patent Publication (Kokai) No. 6-159129).

FIG. 3 is a diagram illustrating the constitution of a device for detecting knocking. The output of the amplifying circuit 195 of the ionic current detecting unit 19 is supplied to an integrating unit 33 through an LC resonance masking unit 31 for masking LC resonance and a band-pass filtering unit 32. An integrated value of the ionic current which is the output of the integrating unit is supplied to the ignition timing control unit 14 and is used for detecting knocking and for controlling the ignition timing.

However, if the timing for resetting the LC resonance masking unit is overlapped by the timing in which the ionic current increases when the engine speed is high, the output of the LC resonance masking unit 31 may stepwisely change when the LC resonance masking unit is reset.

This stepwise change has a broad frequency range and causes, through the band-pass filtering unit 32, the output of the integrating unit 33 to be raised. Therefore, it is difficult to prevent this change from being erroneously determined as knocking.

FIG. 4 is a diagram illustrating the problems, and shows the output of the LC resonance masking unit 31, the output of the band-pass filtering unit 32 and the output of the integrating unit 33, and wherein the abscissa represents time.

That is, when the LC resonance masking unit is reset at $t_1$, the signal input to the band-pass filtering unit 32 stepwisely changes from "0" to a given positive value. Therefore, noise due to this stepwise change appears on the output of the band-pass filtering unit 32. Accordingly, the output of the integrating unit 33 increases due to the noise and exceeds a knocking threshold value NL due to spike noise, generated at $t_2$, erroneously discriminated as an occurrence of knocking.

The present invention was accomplished in view of the above-mentioned problems, and its object is to provide a device for detecting knocking in an internal combustion engine capable of preventing the accuracy for detecting knocking from being deteriorated by noise when the LC resonance masking unit is reset.

SUMMARY OF THE INVENTION

The present invention is directed to a device for detecting knocking in an internal combustion engine comprising an ionic current detecting unit which applies a voltage across a pair of electrodes installed in a combustion chamber of the internal combustion engine and detects an ionic current flowing between the pair of electrodes when the gas mixture in the combustion chamber is burned. The device further includes means for masking LC resonance noise superposed on a signal output from the ionic current detecting unit after discharge of the spark plug and a band-pass filtering means for extracting knocking frequency components from a signal output of the LC resonance masking means. Means are also included for determining whether knocking has occurred in the internal combustion engine based upon a signal output from the band-pass filtering means along with a buffering device installed between the LC resonance masking means and said band-pass filtering means, wherein the buffering device includes an operational amplifier including an inverting input and an output, an input resistor coupled to the inverting input and a feedback resistor connected between the output of the operational amplifier and the inverting input, and a capacitor connected in parallel with the feedback resistor.

BRIEF DESCRIPTION OF THE DRAWINGS

FIGS. 2A to 2E are diagrams of voltage waveforms at each of the portions of the ignition circuit;

DETAILED DESCRIPTION OF THE PREFERRED EMBODIMENT

Figure 1:
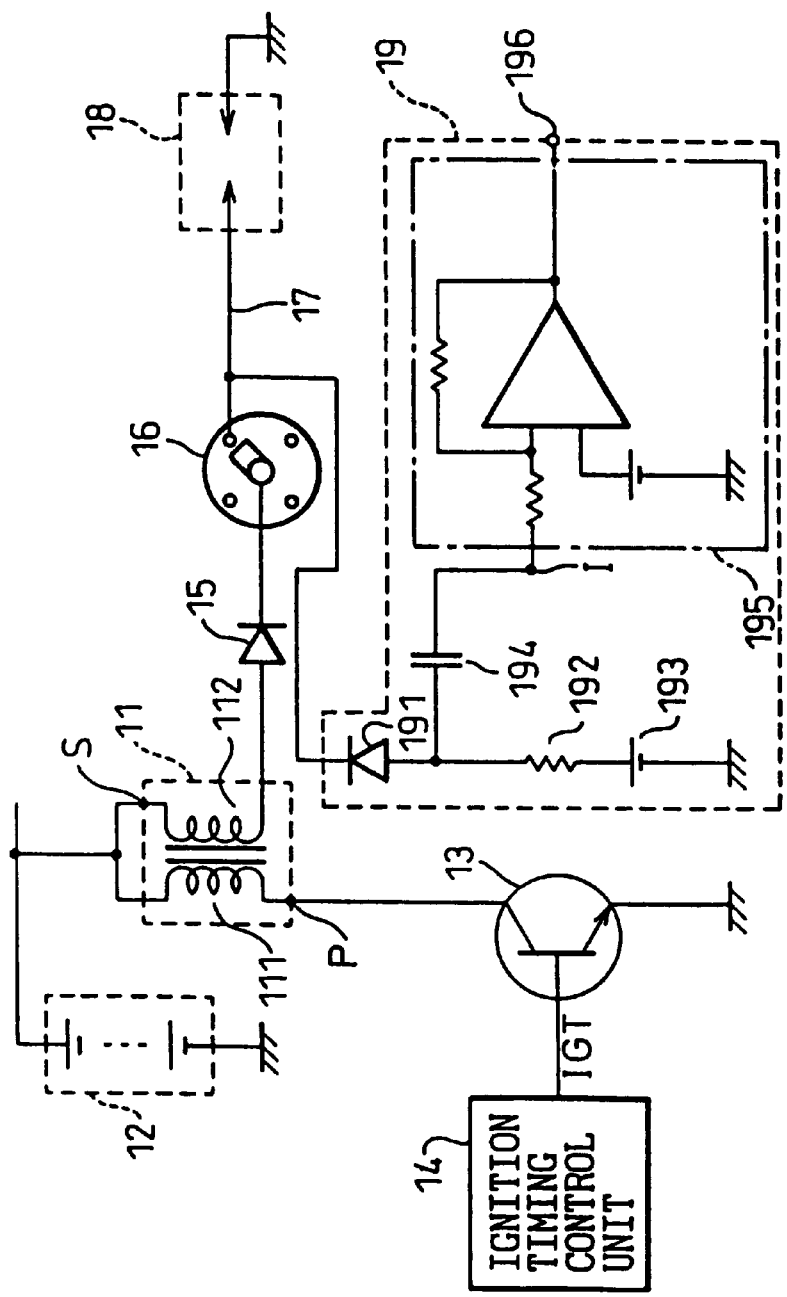
FIG. 1 is a diagram schematically illustrating an ignition circuit for an internal combustion engine.
Figure 3:
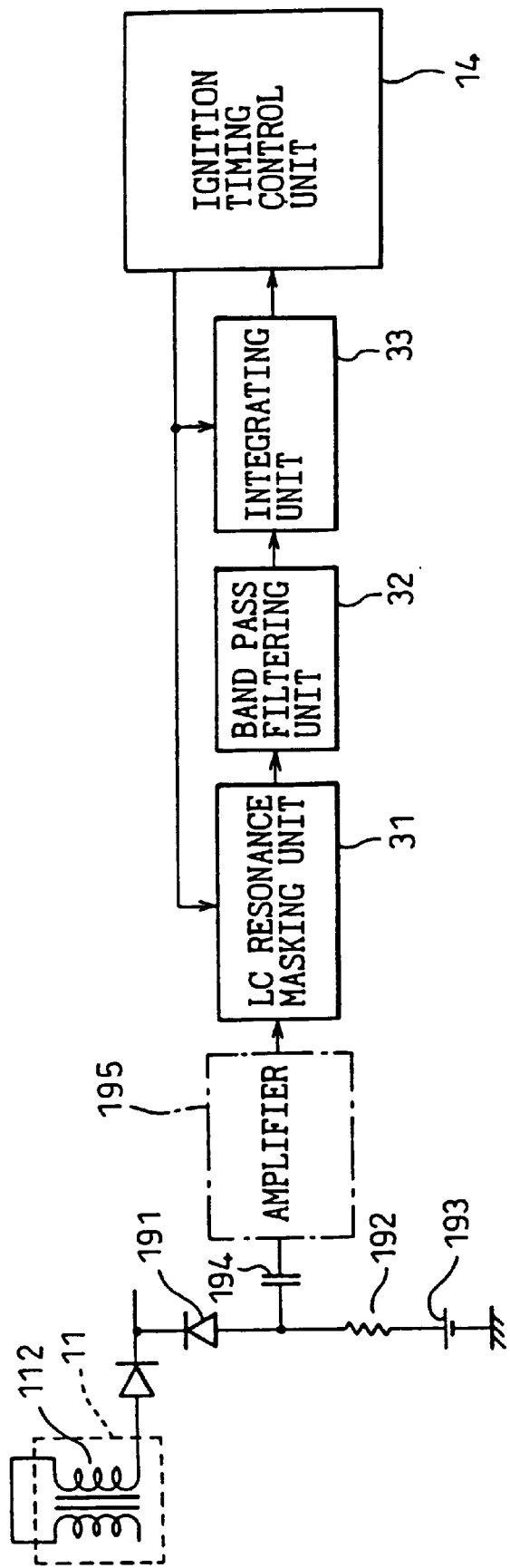
FIG. 3 is a diagram illustrating the constitution of a device for detecting knocking by using the ionic current.
Figure 4:
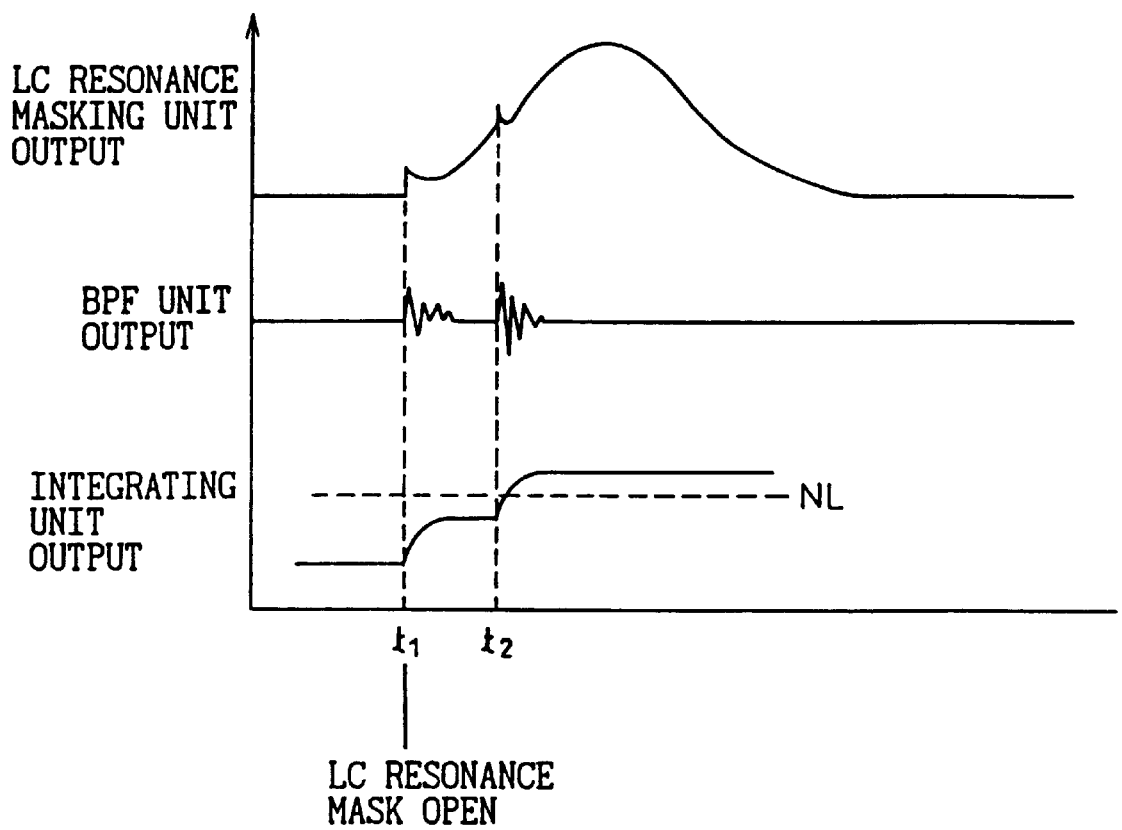
FIG. 4 is a diagram explaining the problems.
Figure 5:
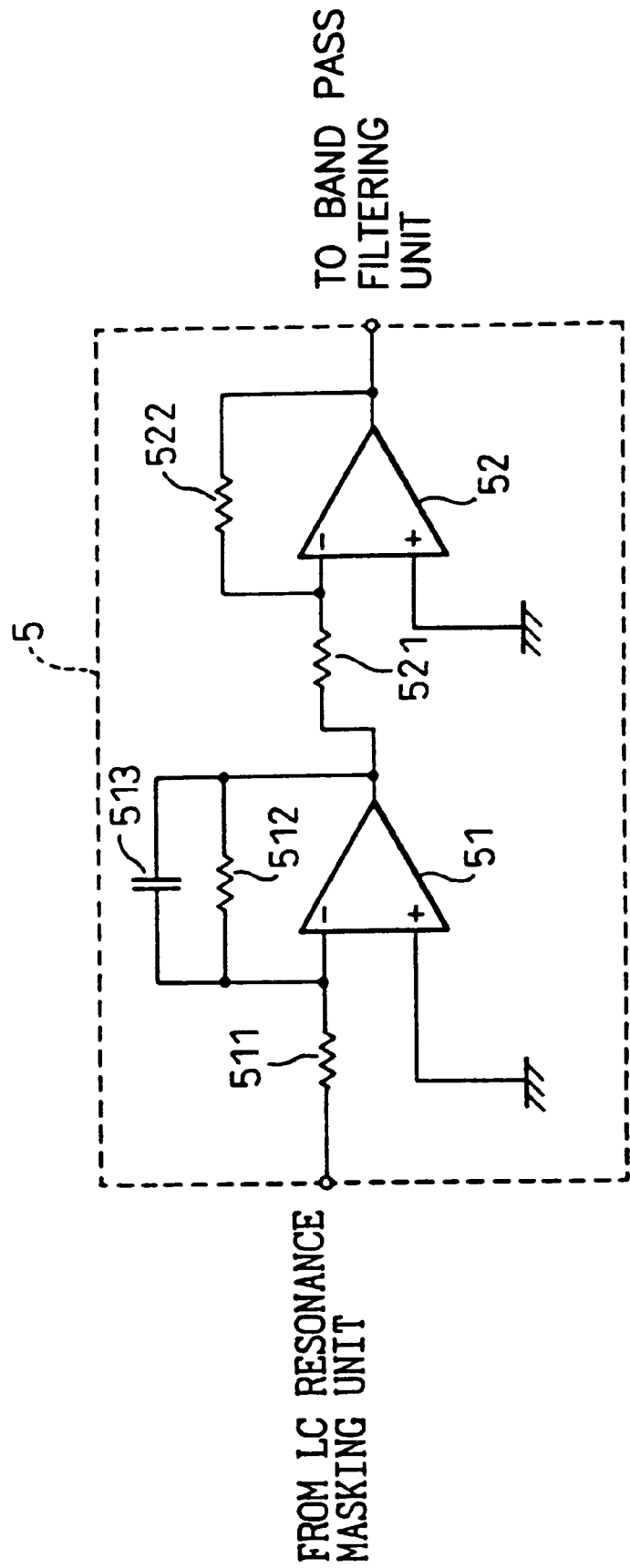
FIG. 5 is a diagram illustrating the circuit of a buffer amplifier.

FIG. 5 is a diagram illustrating the circuit of a buffer amplifier that is adapted to a device for detecting knocking in an internal combustion engine according to the present invention and is arranged between the LC resonance masking unit 31 and the bandpass pass filtering unit 32 of the device of FIG. 3 which, as described above, is connected to the ion deteting unit 19 of FIG. 1.

That is, the buffer amplifier 5 includes a first operational amplifier 51 and a second operational amplifier 52.

The output of the LC resonance masking unit 31 is connected, via a first input resistor 511, to an inverting input terminal (negative terminal) of the first operational amplifier 51. A non-inverting input terminal (positive terminal) of the first operational amplifier 51 is directly grounded.

A first feedback resistor 512 and a capacitor 513 for rejecting noise are connected between the output terminal and the inverting input terminal of the first operational amplifier 51.

The second operational amplifier 52 again inverts the signal that was inverted by the first operational amplifier 51. The output of the first operational amplifier 51 is connected to an inverting input terminal (negative terminal) of the second operational amplifier 52 through a second input resistor 521. A non-inverting input terminal (positive terminal) of the second operational amplifier 52 is directly grounded. A second feedback resistor 522 is connected between the output terminal and the inverting input terminal of the second operational amplifier 52.

It is desired that the capacitor 513 has a capacity of from several tens to several thousands of picofarads (pF) in order to reject noise without cutting the knocking signal of about 6KHz when the LC resonance masking unit is reset.

Figure 6A:
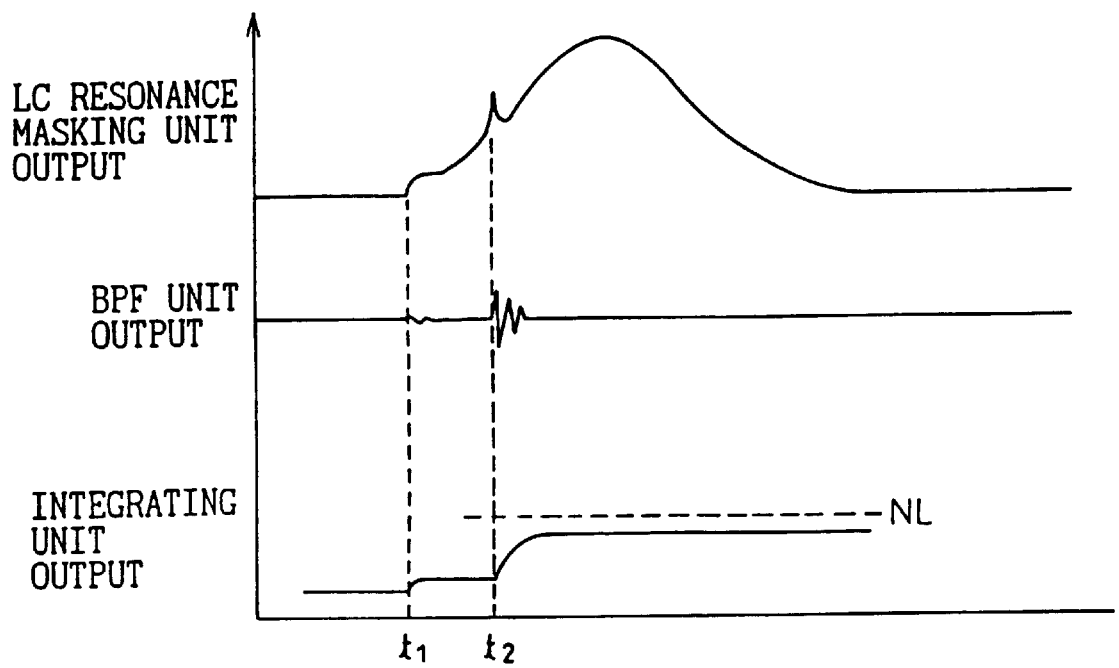
FIG. 6A to 6B are diagrams explaining the effects.
Figure 6B:
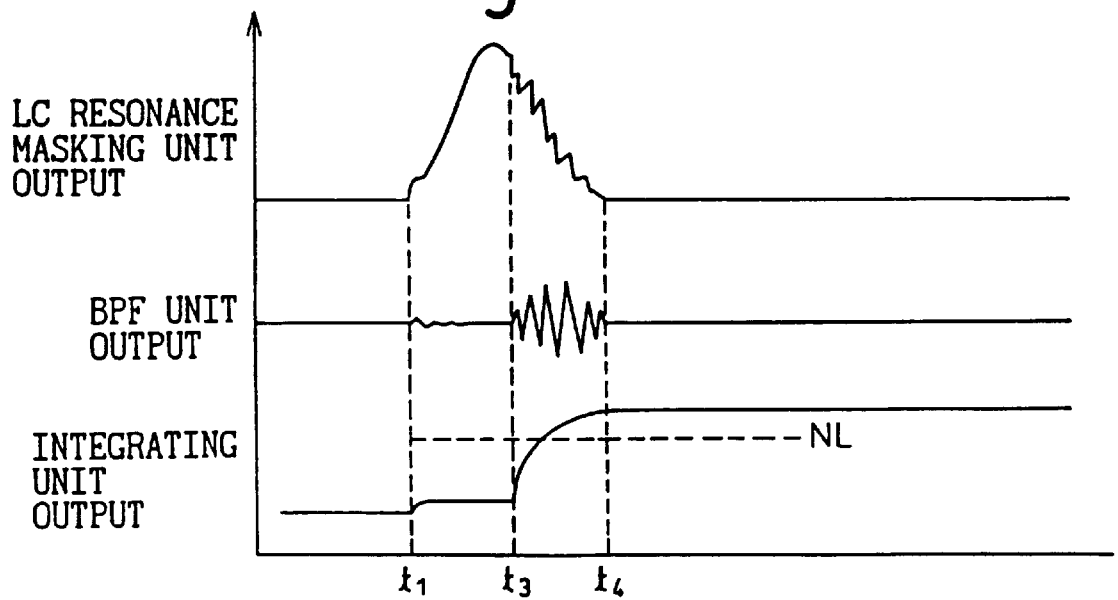

FIGS. 6A and 6B are diagrams for explaining the effects of the present invention, wherein FIG. 6A illustrates a case where knocking is not occurring but the spike noise is generated, and FIG. 6B illustrates a case where knocking is occurring.

FIGS. 6A and 6B show the output of the LC resonance masking unit 31, the output of the band-pass filtering unit 32 and the output of the integrating unit 33, and wherein the abscissa represents time.

That is, when the LC resonance masking unit is reset at $t_1$, a stepwise change does not develop in the output of the LC resonance masking unit 31; i.e., the output of the LC resonance masking unit 31 rises gradually. At $t_1$, therefore, the output of the integrating unit 33 hardly rises. When the spike noise is generated at $t_2$ and the output of the integrating unit 33 rises, the output of the integrating unit 33 does not exceed the knocking threshold level NL, and this change is not erroneously discriminated as the occurrence of knocking.

When the knocking occurs from $t_3$ to $t_4$, the output of the integrating unit 33 largely increases to exceed the knocking threshold level NL, and the occurrence of knocking is reliably detected.

what is claimed is:

1. A device for detecting knocking in an internal combustion engine comprising:

an ionic current detecting unit which applies a voltage across a pair of electrodes installed in a combustion chamber of the internal combustion engine and detects an ionic current flowing between the pair of electrodes when a gas mixture in the combustion chamber is burned;

means for masking LC resonance noise superposed on a signal output from the ionic current detecting unit after discharge of a spark plug;

a band-pass filtering means for extracting knocking frequency components from a signal output from the LC resonance masking means;

means for determining whether knocking has occurred in the internal combustion engine based upon a signal output from the band-pass filtering means; and a buffering device installed between the LC resonance masking means and the band-pass filtering means, the buffering device rejecting a stepwise chance in a signal input to the band-pass filtering means when the LC resonance masking means is reset, wherein the buffering device includes an operational amplifier including an inverting input and an output, an input resistor coupled to the inverting input and a feedback resistor connected between the output of the operational amplifier and the inverting input, and a capacitor connected in parallel with the feedback resistor.

2. The device of claim 1, wherein the buffering device further includes an inverting operational amplifier arrangement coupled between the operational amplifier and the band-pass filtering means.

3. The device of claim 1, wherein the buffering device further includes an inverting operational amplifier arrangement coupled between the operational amplifier and the band-pass filtering means, and the capacitor of the buffering device is selected so that the buffering device rejects noise without substantially cutting the knocking frequency components when the LC resonance masking means is reset.

4. A device for detecting knocking in an internal combustion engine, the device comprising:

an ionic current detecting unit detecting an ionic current flowing between a pair of electrodes when a gas mixture in a combustion chamber of the internal combustion engine is burned.

a resettable LC resonance masking device masking LC resonance noise superimposed on an output signal from the ionic current detecting unit after a discharge of a spark plug wherein, upon resetting of the LC resonance masking device, a step change in an output of the LC resonance masking device is produced;

a band-pass filter extracting at least one knock frequency component from a signal output from the masking device;

a processor determining whether a knocking condition has occurred in the internal combustion engine based on an output signal from the band-pass filter; and a buffer device coupled between the masking device and the band-pass filter, the buffer device rejecting step changes in the output signal, wherein the buffer device includes an operational amplifier having an inverting input terminal and an output terminal, a first resistor coupled to the inverting input terminal, a second resistor coupled between the output terminal and the inverting input terminal, and a capacitor coupled in parallel to the second resistor.

* * * * *

UNITED STATES PATENT AND TRADEMARK OFFICE
CERTIFICATE OF CORRECTION

PATENT NO. : 6,054,860
DATED : April 25, 2000
INVENTOR(S) : Keiichiro AOKI, et al.

It is certified that error appears in the above-identified patent and that said Letters Patent is hereby corrected as shown below:

Column 2, line 19, change "1)" to --$t_1$,--.

Column 4, line 12, change "FIG." to --FIGS.--.

Column 5, line 26, change "chance" to --change--.

Signed and Sealed this

Twenty-ninth Day of May, 2001

*Attest:*

NICHOLAS P. GODICI

*Attesting Officer*  *Acting Director of the United States Patent and Trademark Office*